J. A. DADY.
GOPHER POISONER.
APPLICATION FILED SEPT. 20, 1918.

1,296,771. Patented Mar. 11, 1919.

INVENTOR:
Joseph A. Dady,
BY his ATTORNEY:
A. M. Carlsen.

UNITED STATES PATENT OFFICE.

JOSEPH A. DADY, OF KELLOGG, MINNESOTA.

GOPHER-POISONER.

1,296,771. Specification of Letters Patent. Patented Mar. 11, 1919.

Application filed September 20, 1918. Serial No. 254,987.

*To all whom it may concern:*

Be it known that I, JOSEPH A. DADY, citizen of the United States, residing at Kellogg, in the county of Wabash and State of Minnesota, have invented a new and useful Gopher-Poisoner, of which the following is a specification.

Figure 1:
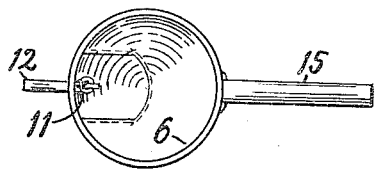
Figure 2:
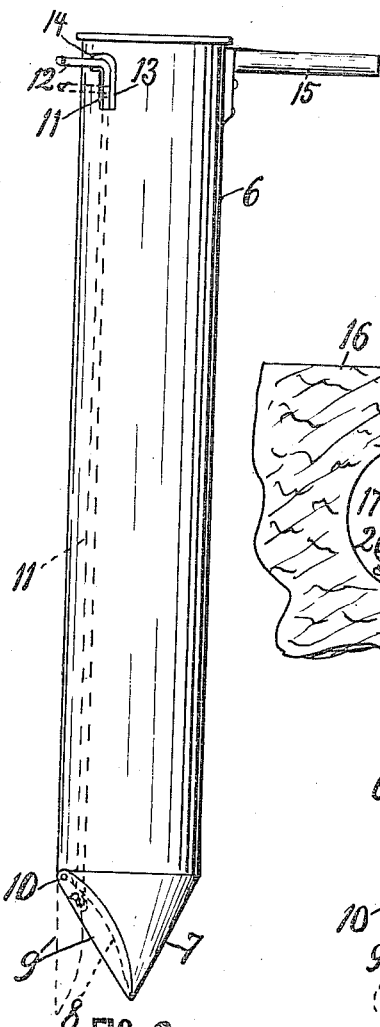
Figure 5:
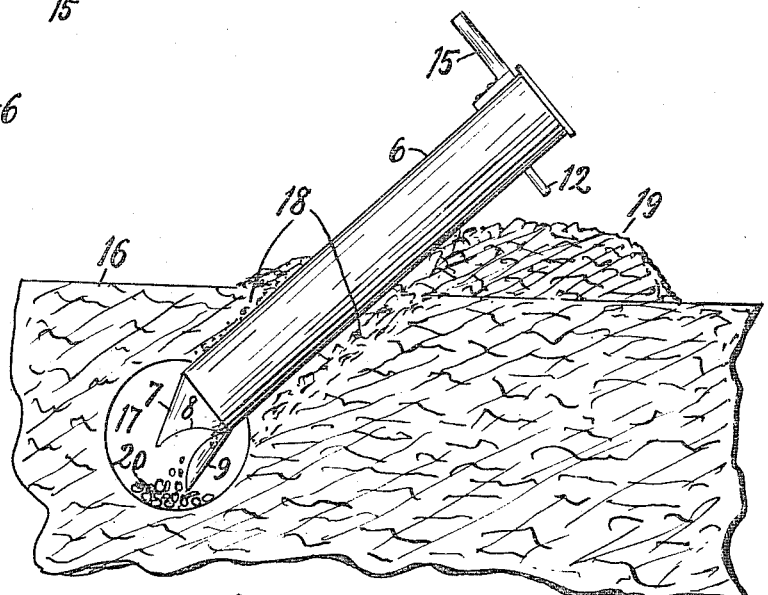
Figure 3:
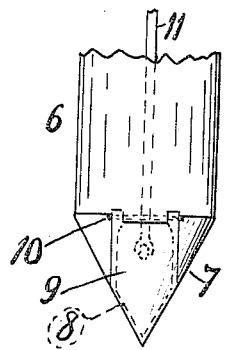
Figure 4:
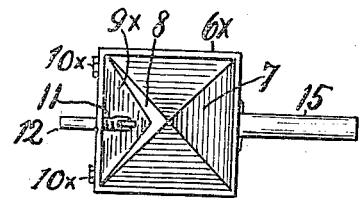

My invention relates to devices for poisoning rodents having underground runways; it is especially designed for the poisoning of pocket gophers, as said tribe of animals keep almost constantly below the surface of the ground, in runways where poisoned corn can not be placed without great difficulty. Such difficulty I overcome by providing a kind of injector which I force through the earth and into the runway and inject therein the poisoned corn or other bait. Said injector or injecting device is illustrated in the accompanying drawing, in which:

Figure 1 is a top view of the device. Fig. 2 is a side elevation of the device shown in Fig. 1 with the valve-operating handle moved slightly over to one side. Fig. 3 is a left hand side view of the lower portion of Fig. 2, with the valve slightly modified. Fig. 4 is a top view of the device showing a modified form of its body and valve. Fig. 5 is a vertical section of some earth with a gopher runway, and my device inserted therein in position for operation.

Referring to the drawing by reference numerals, the body of the device consists of a tube which may be either cylindrical as 6 in Figs. 1, 2, 3 and 5, or square as 6ˣ in Fig. 4. The front or lower end of the tube is formed with a funnel-shaped point 7 having in one side an aperture 8, normally closed by a lid or valve 9 which is hinged at 10.

Pivotally attached to said valve is the lower end of a rod 11, which extends upwardly through the tubular body and has its upper end provided with a handle 12 extending outward through a longitudinal slot 13 near the upper end of the body tube; said slot has a lateral extension or notch 14 adapted to receive the handle and thereby hold the valve closed.

The upper end of the tube is provided with a suitable handle 15 by which to carry the device, and also for getting a firm hold of it to insert it in the ground.

In the use or operation of the device, if we suppose the field or earth 16 to have a runway 17 from which the earth has been dug out by a pocket gopher and pushed out of a lateral or transverse duct 18 into a heap like 19, as is the usual way pocket gophers operate, closing each lateral passage as fast as a new one is formed farther forward in the main duct 17, the operator places a small quantity of poisoned corn 20, in the tube 6 while the valve 9 is closed. He then pushes the device through the ground close by one of the hills 19 until he feels that the point 7 is in the runway 17; he then grasps the handle 12 and pushes the valve rod downward, thereby opening the valve 9 so that the corn drops, as shown at 20 in Fig. 5, into the runway; he now extracts the device from the earth and closes up the hole by a handful of grass, a lump of earth, or any means handy, so as to exclude light from the hole and the runway. When the gopher comes along in passing between its home in the ground and the potato field or other plantation from which it is trying to carry its winter supplies of food stuffs, it finds the poisoned corn, eats it and dies from it.

In the modification shown in Fig. 4 the hinges may be two, as 10ˣ and the valve 9ˣ is a plane triangular plate; said valve is shown as partly opened. The said modification is to show that I do not confine the body of the device to the cylindrical form but may make it of square or other polygonal form, and the valve may have one or more hinges and be either plane or curved.

What I claim is:

In a gopher poisoner of the class described, a tube having its lower end pointed to a cone-shape and provided with a lateral aperture, said tube having near its upper end a longitudinal slot with a lateral notch near its top end, a hinged valve arranged to close said aperture, an operating rod attached with one end to the inner side of the valve and extending wholly inside the tube to the said slot, and having there a laterally pointing handle projecting outward through the slot and adapted to hold the valve closed when engaged in the notch of the slot.

In testimony whereof I affix my signature.

JOSEPH A. DADY.